US006549640B1

(12) United States Patent
Sansone et al.

(10) Patent No.: US 6,549,640 B1
(45) Date of Patent: Apr. 15, 2003

(54) SYSTEM FOR METERING AND AUDITING THE DOTS OR DROPS OR PULSES PRODUCED BY A DIGITAL PRINTER IN PRINTING AN ARBITRARY GRAPHIC

(75) Inventors: Ronald P. Sansone, Weston, CT (US); Judith A. Martin, Stamford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/458,237

(22) Filed: Dec. 9, 1999

(51) Int. Cl.[7] .................. G06K 9/00

(52) U.S. Cl. .................. 382/101; 705/401

(58) Field of Search .................. 382/101; 235/101; 705/401, 405, 408, 62

(56) References Cited

U.S. PATENT DOCUMENTS 4,121,222 A 10/1978 Diebold et al. ............ 346/75
4,413,264 A 11/1983 Cruz-Uribe et al. ......... 346/1.1
4,455,562 A 6/1984 Dolan et al. ............ 346/154
4,872,027 A 10/1989 Buskirk et al. ......... 346/140 R
5,049,898 A 9/1991 Arthur et al. ............ 346/1.1
5,068,806 A 11/1991 Gatten .................. 395/113
5,414,452 A 5/1995 Accatino et al. ............ 347/7
5,513,563 A 5/1996 Berson .................. 101/91
5,694,156 A 12/1997 Hoisington et al. ............ 347/7
5,793,388 A 8/1998 Martinson et al. ............ 347/19
5,841,886 A * 11/1998 Rhoads .................. 382/115
6,350,006 B1 * 2/2002 Muller et al. ............ 347/19
6,389,151 B1 * 5/2002 Carr et al. ............ 382/100
6,408,286 B1 * 6/2002 Heiden .................. 101/71
6,427,021 B1 * 7/2002 Fischer et al. ............ 382/101

* cited by examiner

*Primary Examiner*—Brian Werner
*Assistant Examiner*—Ryan J. Miller
(74) *Attorney, Agent, or Firm*—Ronald Reichman; Angelo N. Chaclas

(57) ABSTRACT

A system that hides information in a customer supplied graphic. The apparatus of this invention provides a device for verifiable security in a postage meter or other devices using dot or drop printing. Security is achieved by counting the number of signal pulses that are used to produce ink drops or ink dots that are required to reproduce the customer supplied graphic. The aforementioned may be accomplished by adding a smart module to digital print head modules. The smart module would capture driver pulses from the print head module and interpret the pulses associated with regions of the graphic. Thus, the smart module would take data from the printer controller that is used to cut off printing when the ink is consumed and relate "set" values to the drops produced during the production of the graphic or portions of the graphic, thereby linking the postal value printed in the indicia to the information hidden in the graphic or portions of the graphic.

15 Claims, 15 Drawing Sheets

SYSTEM FOR METERING AND AUDITING THE DOTS OR DROPS OR PULSES PRODUCED BY A DIGITAL PRINTER IN PRINTING AN ARBITRARY GRAPHIC

CROSS REFERENCE TO RELATED APPLICATIONS

Reference is made to commonly assigned patent applications, now U.S. Pat. No. 6,318,856, filed herewith entitled "System for Metering and Auditing the Dots or Drops or Pulses Produced by a Digital Printer," in the name of Ronald P. Sansone, and U.S. Pat. No. 6,361,164 filed herewith entitled "System That Meters the Firings of a Printer to Audit the Dots or Drops or Pulses Produced by a Digital Printer" in the name of Ronald P. Sansone.

FIELD OF THE INVENTION

This invention pertains to digital printing and more particularly to the metering and auditing of the dots or drops produced by a digital printer in printing an arbitrary graphic.

DESCRIPTION OF THE PRIOR ART

Printers that print characters in the form of dots have been utilized in postage meters and other devices. The aforementioned printers form characters and/or graphics from a matrix of dots. Unlike the fully formed character printing methods, the printing elements are organized in rows or columns which print dots. A character in a dot printer is formed sequentially by printing at one time all the selected dots, respectively, in a column or a row. Graphics are made possible by precisely positioning dots on a page.

Printers that print characters and graphics by depositing drops of ink on a medium have been utilized in postage meters and other devices. The aforementioned printers form characters and graphics by selectively firing droplets of ink onto a surface. The ink dries upon its absorption into the substance.

Laser printers print characters and graphics by utilizing a focused laser beam and a rotating mirror to draw an image of the desired page on a photosensitive drum. The laser is pulsed periodically or fired periodically to produce small discharged areas on the photosensitive drum that represent the image. The charged image attracts and holds toner. A piece of paper is rolled against the drum while a charged plate behind the paper attracts the toner away from the drum and onto the paper. Heat and/or pressure is then applied to fuse the toner to the paper.

Dot matrix printers print characters. A dot matrix printer may have a 9 or 24 pin head. The pins impact the paper through a ribbon, creating patterns of dots in the shape of letters and numbers in multiple fonts and type sizes.

Thermal matrix printers have an array of 100–200 pins which are placed in contact with thermally sensitive paper. The pins are pulsed or fired with electrical current heating the pins. The heat produced darkens selective areas of the moving paper.

Printers that print by using dots and drops are commercially available as desk top printers and are often utilized as output devices of personal computers. The wide use of the above printers has made it easier to forge documents. Thus, additional security is needed to determine the authenticity of the printed document. One method that has been proposed for providing security is to print encrypted information in the document and decrypting the information at a later time to authenticate the document. One of the disadvantages of the foregoing is that it may be necessary to use a large amount of space on the document to prevent the encrypted information from being decrypted.

Another method that has been proposed for providing security to documents is to print authenticating text in invisible ink that does not interfere with the document upon which such text is printed, but would still allow one to determine the authenticity of the document. A luminescent ink may also be used for similar security purposes. One of the disadvantages of the foregoing is that it may be necessary to use special chemicals or an ultraviolet light source to read the authenticating text.

Another method utilized by the prior art for providing security to documents involved the hiding of some information in the document or the modification of some information in the document. The hidden or modified information may be placed in graphics contained in the document. The hidden or modified information was accurately placed so as not to disturb the information. One of the disadvantages of the above is that it is difficult to read the hidden or modified information.

With the introduction of postage meters that print a postal indicia by means of digital printing, it became possible to print graphic advertising material, slogans in the vicinity The postal indicia. Heretofore, no security information was placed within the graphic advertising material or slogans.

SUMMARY OF THE INVENTION

This invention overcomes the disadvantages of the prior art by providing a system that hides information in a customer supplied graphic. The apparatus of this invention provides a device for verifiable security in a postage meter or other devices using dot or drop printing. Security is achieved by counting the number of signal pulses that are used to produce ink drops or ink dots that are required to reproduce the customer supplied graphic. The aforementioned may be accomplished by adding a smart module to digital print head modules. The smart module would capture driver pulses from the print head module and interpret the pulses associated with regions of the graphic. Thus, the smart module would take data from the printer controller that is used to cut off printing when the ink is consumed and relate "set" values to the drops produced during the production of the graphic or portions of the graphic, thereby linking the postal value printed in the indicia to the information hidden in the graphic or portions of the graphic.

DETAILED DESCRIPTION OF THE PREFERRED EMBODIMENT

Figure 1:
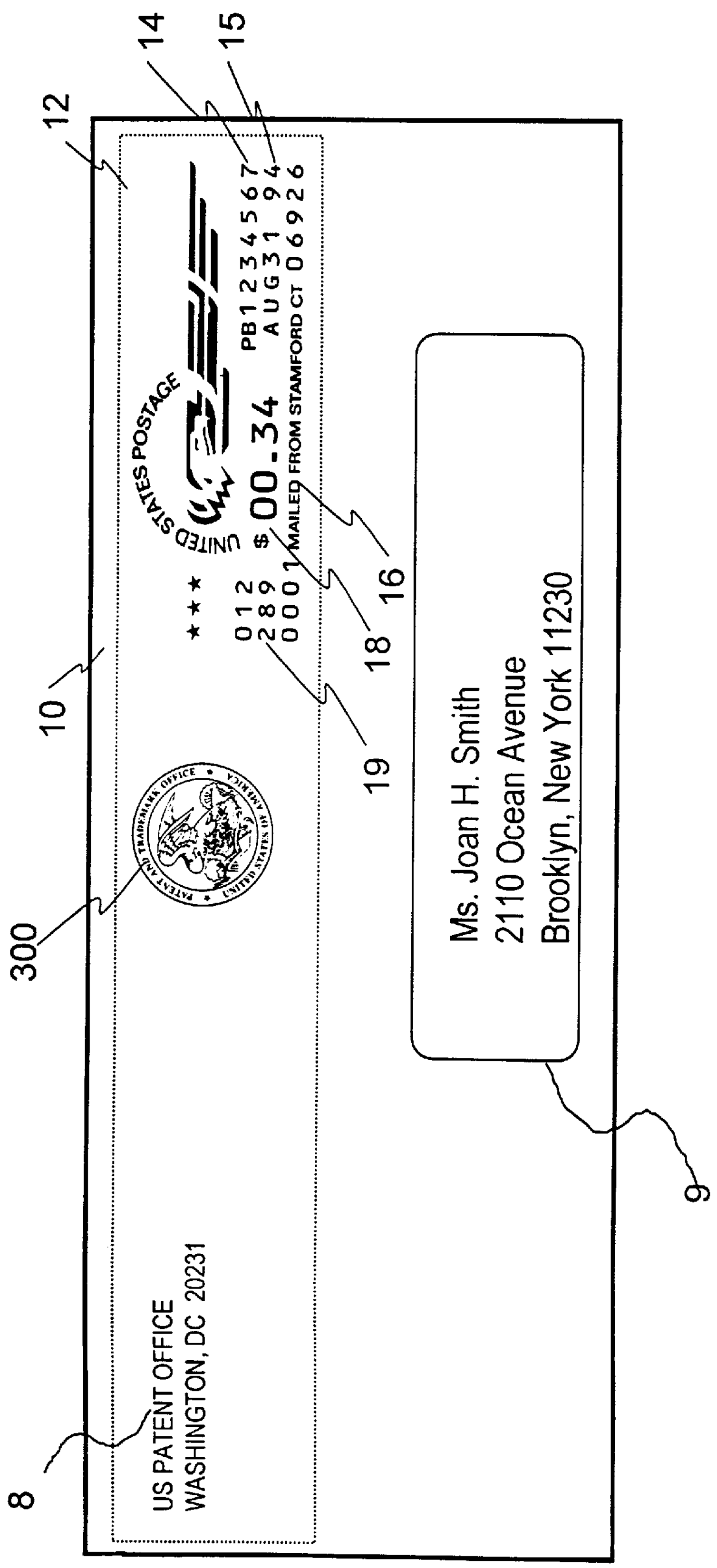
FIG. 1 is a drawing of a postal indicia affixed to a mail piece.

Referring now to the drawings in detail, and more particularly to FIG. 1, the reference character 10 represents a mail piece that has a postal indicia 12 affixed thereto. Indicia 12 contains a postal meter serial number 14, the date 15, the place the mail piece was mailed from 16, a dollar amount 18, and a security code 19. Mail piece 10 includes a customer-supplied graphic 300, i.e.: logo, slogan, seal, picture, design, etc. Graphic 300 may be used by the customer for identification purposes and/or advertising purposes, etc. A recipient address 9 and a return address 8 are also shown on mail piece 10. Indicia 12 and graphic 300 may be printed with an ink jet printer, laser printer or thermal printer (not shown). Indicia 12 may be produced by an electronic postage meter.

Figure 2A:
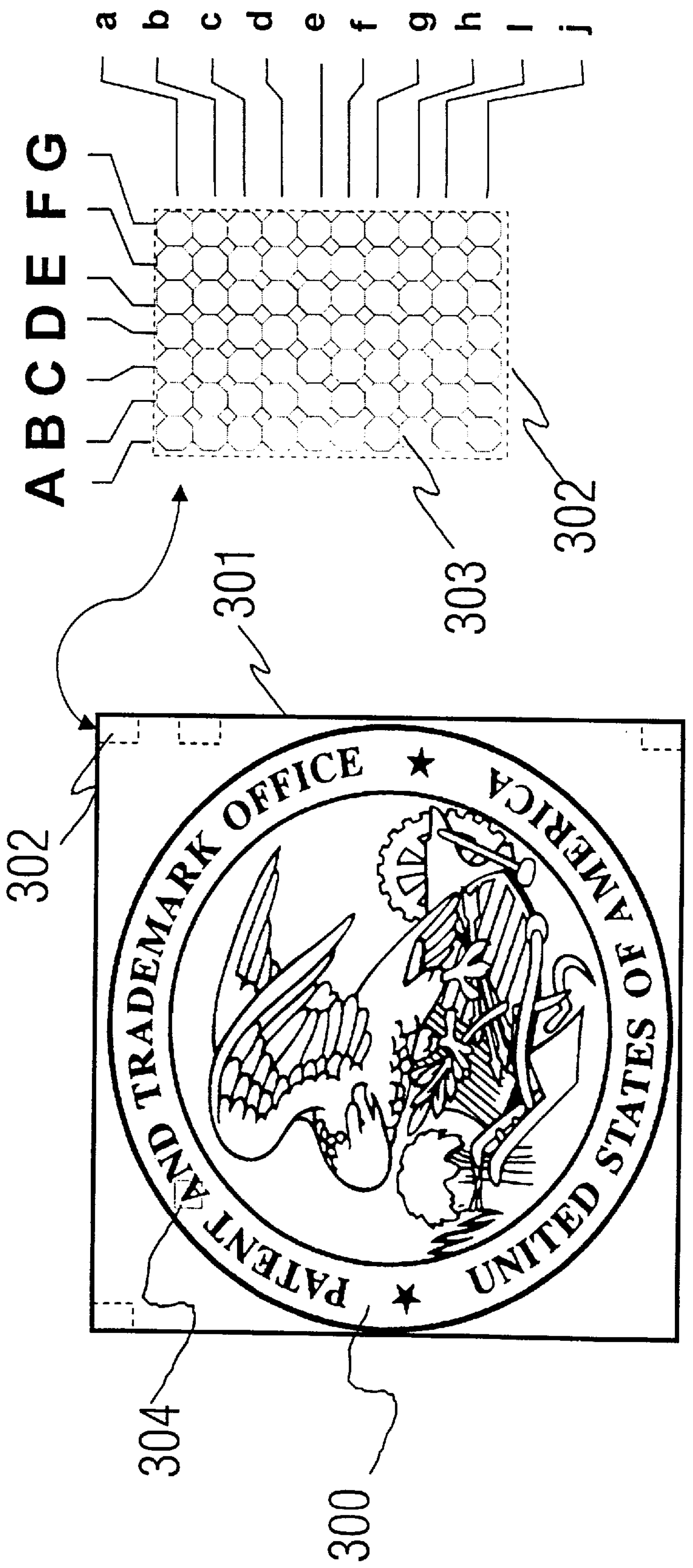
FIG. 2A is a drawing in greater detail of graphic 300 of FIG. 1.

FIG. 2A is a drawing in greater detail of graphic 300 of FIG. 1. Graphic 300 is contained in an area 301 (base image non-volatile memory 389 FIG. 4). Area 301 has 1,290 encoding blocks 302. Each encoding block 302 contains 70 pixels or sampling or encoding cells 303. Each encoding block 302 has 7 columns (columns A, B, C, D, E, F, and G) and 10 rows (rows a, b, c, d, e, f, g, h, i and j). Area 301 has (30) (43) (70)=90,300 pixels or encoding cells 303. A portion of the alphanumeric character "A" in the word "AND" is contained in encoding block 304.

Figure 2B:
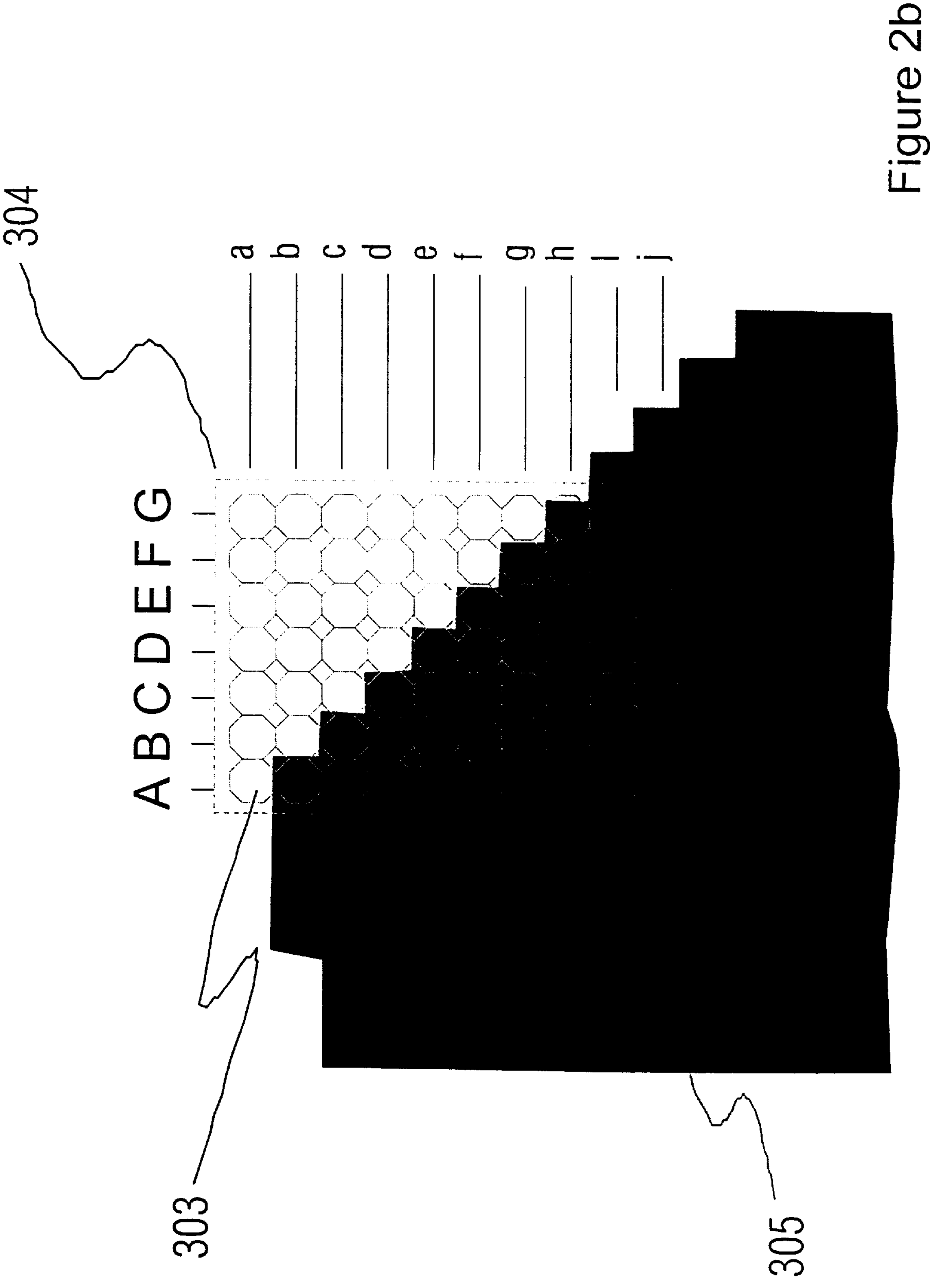
FIG. 2B is a drawing in greater detail of a portion of graphic 300.

FIG. 2B is a drawing in greater detail of a portion of graphic 300. Encoding block 304 is shown having columns A, B, C, D, E, F, and G and rows a, b, c, d, e, f, g, h, i and j. A portion of the alphanumeric character "A" in the word "AND" of graphic 300 is indicated in space 305. No information, i.e., part of a character, is contained in space 303.

Figure 2C:
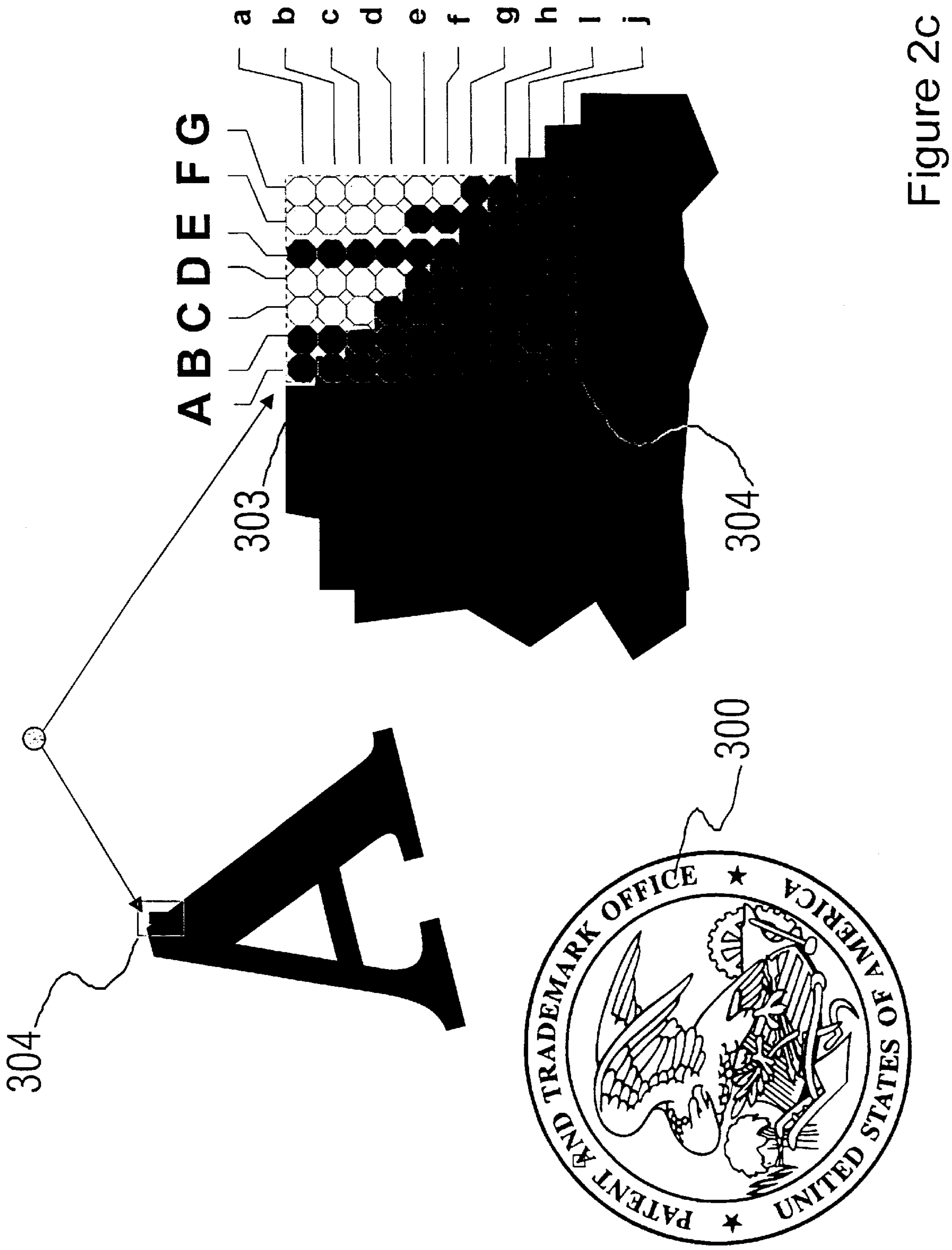
FIG. 2C is a drawing showing the incorporation of a portion of alphanumeric character "A" in the word "AND" of graphic 300 in encoding block 304.

FIG. 2C is a drawing showing the incorporation of a portion of alphanumeric character "A" in the word "AND" of graphic 300 in encoding block 304. Column A of encoding block 304 contains 10 cells 303. Nine cells of column A contain drops of ink which were produced by 9 ink jet pulses. The 9 drops of ink are located in coordinates (A, b), (A, c), (A, d) (A, e), (A, f), (A, g) (A, h), (A, i), and (A, j). Information may be embedded in column A. For instance, column A may be said to represent 9 units (one unit for each drop of ink). Column B of encoding block 304 contains 10 cells 303. Eight cells of column B contain drops of ink which were produced by 8 ink jet pulses. The 8 drops of ink are located in coordinates (B, c), (B, d) (B, e), (B, f), (B, g) (B, h), (B, i), and (B, j). Information may be embedded in column B. For instance, column B may be said to represent 8 units (one unit for each drop of ink).

Column C of encoding block 304 contains 10 cells 303. Seven cells of column C contain drops of ink which were produced by 7 ink jet pulses. The 7 drops of ink are located in coordinates (C, d) (C, e), (C, f), (C, g) (C, h), (C, i), and (C, j). Information may be embedded in column C. For instance, column C may be said to represent 7 units (one unit for each drop of ink). Column D of encoding block 304 contains 10 cells 303. Six cells of column D contain drops of ink which were produced by 6 ink jet pulses. Column E of encoding block 304 contains 10 cells 303. Five cells of column E contain drops of ink which were produced by 5 ink jet pulses. Column F of encoding block 304 contains 10 cells 303. Four cells of column F contain drops of ink which were produced by 4 ink jet pulses. Column G of encoding block contains 10 cells 303. Three cells of column G contain drops of ink which were produced by 3 ink jet pulses.

Figure 2D:
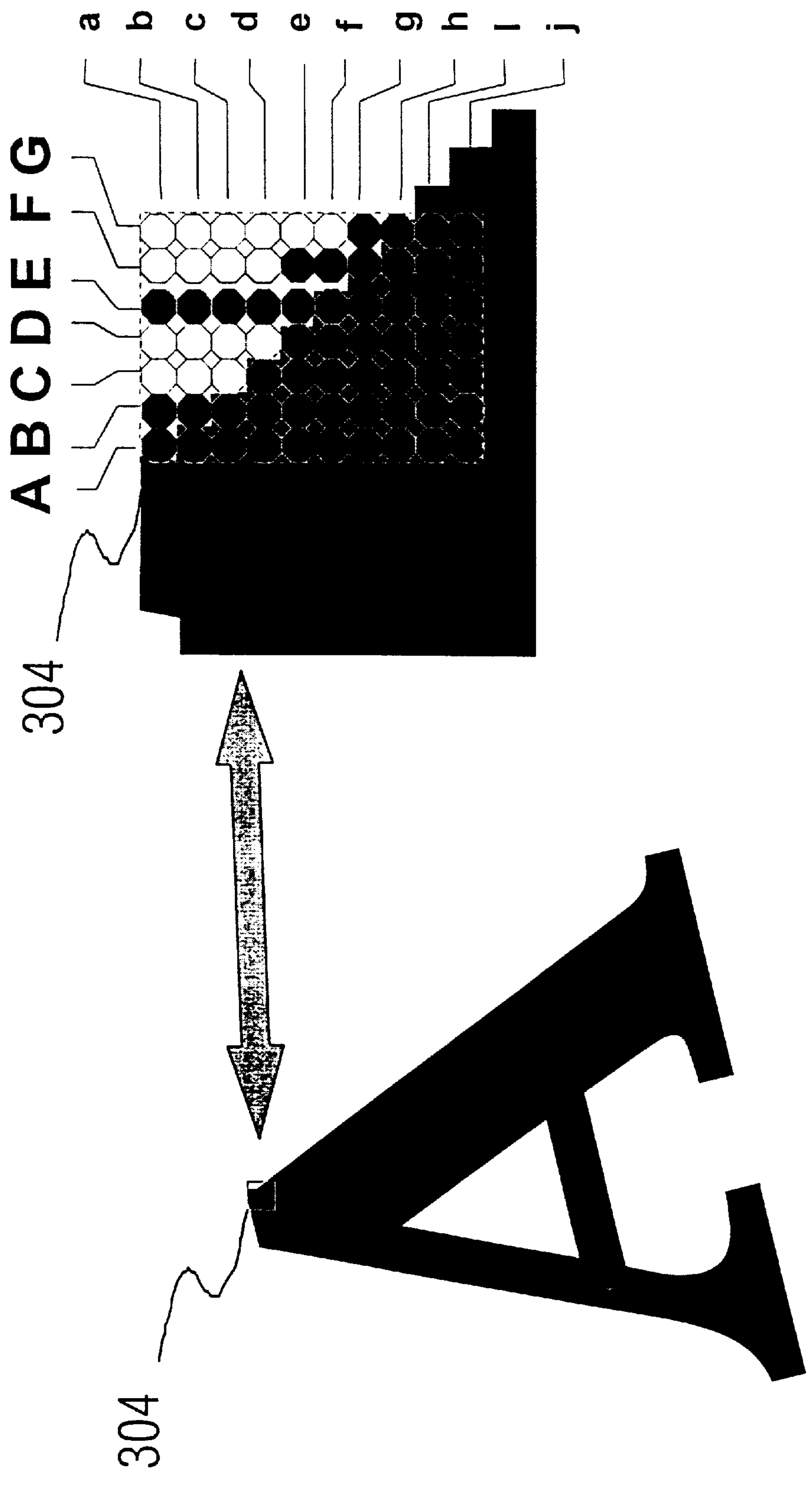
FIG. 2D is a drawing showing the encoding of information in block 304 of graphic 300.

FIG. 2D is a drawing showing the encoding of information in block 304 of graphic 300. The amount of postage 18 indicated by indicia 12 of FIG. 1, namely $0.34 may be indicated in encoding block 304 to increase postal security. The tens of dollar value of the amount of postage 18 is indicated by column A, i.e., 0, and the dollar value is indicated by column B, i.e., 0. The tens of cents value of the amount of postage 18 is indicated by column C, i.e., 3 and the cents value is indicated by column D, i.e., 4. The tenths of cents value of the amount of postage 18 is indicated by column E, i.e., 0. Thus, columns A, B, C, D and E indicate that $00.34 was paid for postage. Additional drops of ink or ink jet pulses will be added or subtracted from columns A, B, C, D and E from the drop pattern shown in FIG. 2C to indicate the amount of postage 18 (FIG. 1). The manner in which the foregoing is accomplished is described in FIG. 5B. A thresholding process is typically used for the encoding of information into encoding block 304. Whether or not the value of a particular cell or pixel 303 should be counted is determined by using a value of 1% to 2% from 0 or white. It would be obvious to one skilled in the art that the amount of postage may also be encoded in the rows of encoding block 304. It would be obvious to one skilled in the art that the presence of ink jet pulses in columns A, B, C, D and E may be used for encoding purposes.

Columns F and G may be used to encode pseudo random numbers produced from the clock pulses of electronic meter 50 (FIG. 4) to supply additional security. The tens of seconds when a clock pulse caused the amount of postage 18 to be set is indicated by column F. i.e., 4, and the seconds when a clock pulse caused the amount of postage 18 to be set is indicated by column G. i.e., 6. If one attempted to guess the numbers in columns F and G, one would only be wrong 99 times out of a 100. Thus, one would have a 1% chance to guess the correct number.

Figure 3:
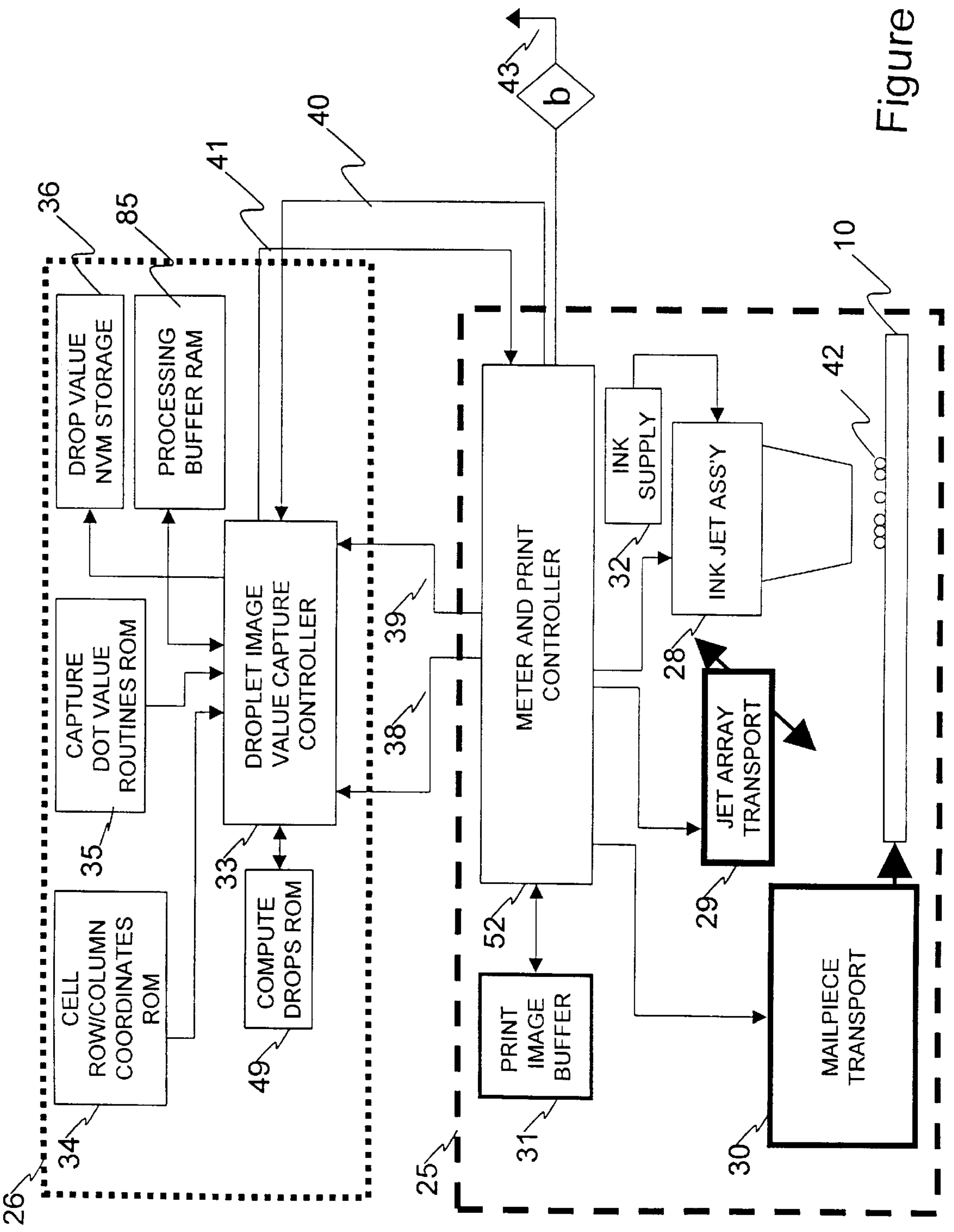
FIG. 3 is a block drawing showing meter controller 52 connected to printer 25 and information capture module 26.

FIG. 3 is a block drawing of meter and printer controller 52 functioning as a printer controller. FIG. 3 shows a print module 25 and an information capture module 26. Print module 25 comprises: a meter and print controller 52; an ink jet assembly 28; an ink jet array transport 29; a mail piece transport 30; a print image buffer 31; and an ink supply 32 that is coupled to ink jet assembly 28. Print controller 52 is coupled to ink jet assembly 28, ink jet array transport 29, mail piece transport 30, print image buffer 31, and ink jet assembly 28. Information capture module 26 comprises: droplet image value capture controller 33; logo cell row/column coordinates Read Only Memory 34; capture drop value routines Read Only Memory 35; compute drop Read Only Memory 49; processing buffer Random Access Memory 85, and drop value storage non-volatile memory 36. Processor 33 is coupled to ROM 34, drop value routines ROM 35, drop value non-volatile storage memory 36, ROM 49, process buffer Random Access Memory 85 and meter and print controller 52. It would be obvious to one skilled in the art that either a laser printer or other digital printers may be used instead of ink jet assembly 28 and ink supply 32 to apply postage to an envelope, label or post card.

When one wants to print indicia 12 and graphic 300 on mail piece 10 (FIG. 1), one places mail piece 10 in the mail piece transport 30 and sets the correct postage value in electronic meter 50 (FIG. 4), i.e. $0.34. Print image input data will then be transferred from print image buffer 31 to meter and print controller 52. The print image input data will include all of the information that is necessary to print indicia 12 and graphic 300. Controller 52 will cause mail piece transport 30 to move mail piece 10 under ink jet assembly 28 back and forth and ink jet array transport 29 to move ink jet assembly 28 to deposit ink drops 42 on mail piece 10 to form indicia 12 and graphic 300. As the printing process proceeds, controller 52 also provides position data via line 38 and droplet data via line 39 to controller 33. Controller 52 will transmit the position data for area 301 of graphic 300 (FIG. 2A) to droplet image value capture processor 33 via line 38. Controller 52 will transmit the droplet data for area 301 of graphic 300 to droplet image value capture processor 33 via line 39, and controller 52 will provide a data clock signal to processor 33 via line 40. At the appropriate time, controller 33 will obtain the row and column coordinates of encoding block 304 from ROM 34. The routines in ROM 35 are used to capture the number of drops in columns A, B, C, D, E, F, and G (FIG. 2D) and to temporarily store the number of drops in the columns in non-volatile memory 36. Controller 33 utilizes the computational routines in ROM 49 to calculate the postage value represented by the number of drops in columns A, B, C, D, and E. Thus, memory 36 will store the dollar amount of postage 18 indicated in indicia 12 (FIG. 1). Controller 33 will transmit the number of drops in columns A, B, C, D and E and their locations and the number and locations of the other drops in encoding block 304 to controller 52 via line 41. Memory 36 will also store the time postage was set in columns F and G.

Figure 4:
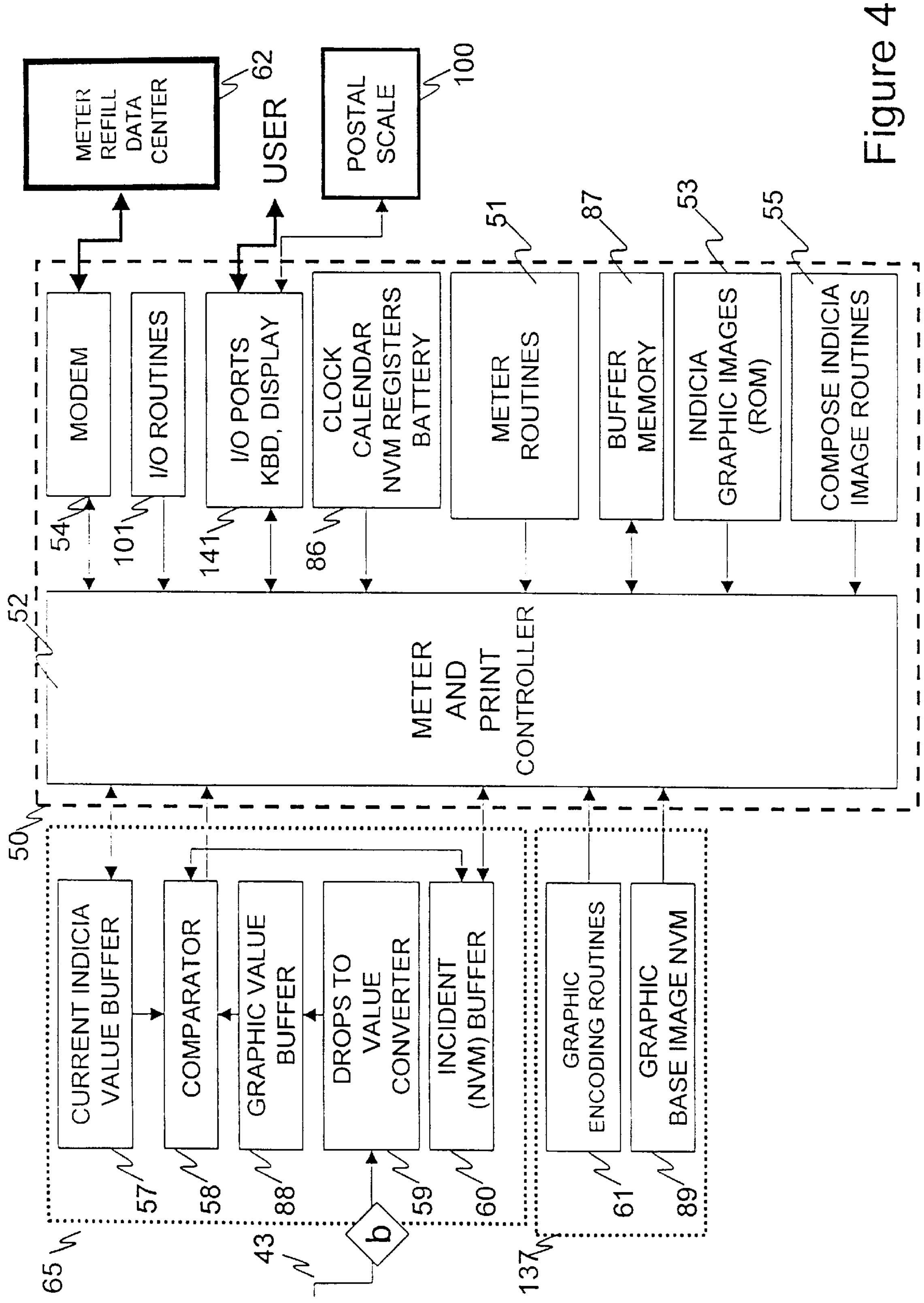
FIG. 4 is a block diagram showing meter and printer controller 52 functioning as a meter controller.

FIG. 4 is a block diagram showing meter and printer controller 52 functioning as a meter controller. Controller 52 will transmit the number of drops in columns A, B, C, D, E, F, and G and their locations to drops to value converter 59 via line 43. Electronic meter 50 includes meter routines 51, meter and print controller 52, fixed graphic image Read Only Memory 53, modem 54, compose indicia image routines 55, clock calendar non-volatile memory and battery 86, I/O routines 101, I/O ports, keyboard and display 141 and buffer memory 87. Controller 52 is coupled to modem 54, I/O routines 101 and meter routines 51, I/O port keyboard and display 141. A postage verifying module 65 is coupled to electronic meter 50. Module 65 includes: a current indicia value buffer 57 that is coupled to controller 52; a comparator 58 that is coupled to buffer 57 and controller 52, graphic value buffer 88 (stores the retrieved from the image of graphic 300) that is coupled to comparator 58; a drops to value buffer and converter 59 that is coupled to buffer 88; an incident, non-volatile memory buffer 60 that is coupled to comparator 58 and to controller 52; encoding module 137 includes logo graphic (graphic 300) encoding routines 61 and logo graphic base (graphic 300) image ROM 389; logo graphic encoding routines 61 are coupled to controller 52 and ROM 89 is coupled to controller 52. Modem 54 is coupled to meter refill data center 62. Postal scale 100 is coupled to I/O ports keyboard and display 141.

Meter 50 begins to function when a user sets the postage dollar amount 18 (FIG. 1) by weighing mail piece 10 on scale 100. Alternatively, the user may enter the weight of mail piece 10 into I/O ports, keyboard and display 141 of meter 50. The weight and amount of postage for mail piece 10 are displayed by meter 50. Controller 52 will compose an image of indicia 12 and graphic 300 (FIG. 1) using the fixed graphic images from ROM 53, using logo graphic encoding routines 61 and using logo graphic base image non volatile memory 89. The above images will be stored in print image buffer 31. Buffer 31 will provide the above images to meter controller 52. Upon completion of indicia 12 and graphic 300, the drop values stored in non-volatile memory 36 may be transferred by controller 33 via line 41 to controller 52. Controller 52 will also transfer the above values via line 43 to value converter 59. Process controller 52 detects the drop information deposited in converter 59 and initiates conversion of the drop information to postal value. Controller 52 stores the value produced by converter 59 in buffer 88. The value stored in buffer 88 is compared by comparator 58 to the value stored in buffer 57. A match causes no output. A mismatch causes the difference between the value in buffer 88 and buffer 57 to be stored in buffer 60. When buffers 57 and 88 do not have the same value, there exists the possibility of fraud or a microprocessor malfunction. Meter routines 51 will handle the accounting functions of meter 50. Routines 51 are not being described.

Modem 54 communicates with meter data center 62 during a refill of postage meter 50 by exchanging funds, and the difference in value between buffers 57 and 88 is stored in buffer 60 so that possible fraud may be investigated.

Figure 5A:
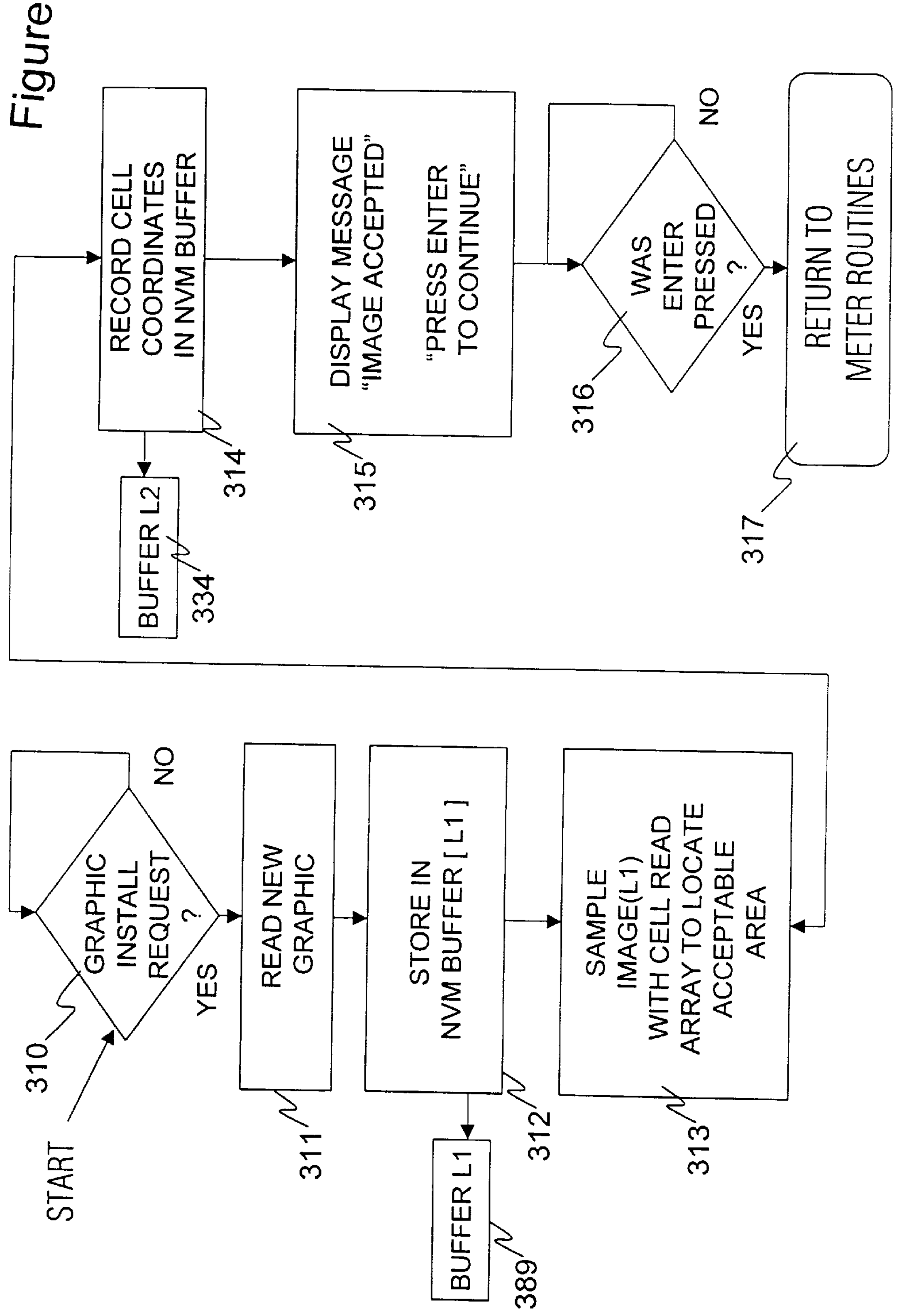
FIG. 5A is a flow chart showing how graphic 300 is installed in buffer 389 and how graphic 300 is sampled to find a location to encode the postage value.

FIG. 5A is a flow chart showing how graphic 300 is installed in buffer 389 and how graphic 300 is sampled to find a location to encode the postage value. Previously, the user of meter 50 sent the meter manufacturer graphic 300, and the meter manufacturer stored graphic 300 in electronic form, i.e.: a Read Only Memory, Chip or card, etc. and sent the electronic form of the image back to the user. Then the user may install the ROM , chip or card, etc. in meter 50. Block 310 determines whether or not graphic 300 was installed in meter 50. If block 310 determines that graphic 300 was not installed in meter 50, the program goes back to the input of block 310. If block 310 determines that graphic 300 was installed in meter 50, the program goes to block 311.

Block 311 reads the graphic 300 that was just installed. Then, the program goes to block 312. Block 312 stores graphic 300 in the buffer in block 389. Now the program goes to block 313. Block 313 samples the image of graphic 300 stored in the buffer of block 389 to locate an acceptable area to encode postage 18 (FIG. 1) and the time meter 50 was set. Then the program goes to block 314. Block 314 records the cell coordinates of columns A, B, C, D, E, F, and G of encoding block 304 in the non-volatile memory of the buffer in block 334.

At this point, the program goes to block 315 to display the message “graphic accepted” and to notify the user to “press enter to continue”. Then the program goes to decision block 316. Decision block 316 determines whether or not “enter” was pressed. If block 316 determines that “enter” was not pressed, the program goes back to the input of block 316. If block 316 determines that “enter” was pressed, the program goes to block 317 to return to meter routines 51.

Figure 5B:
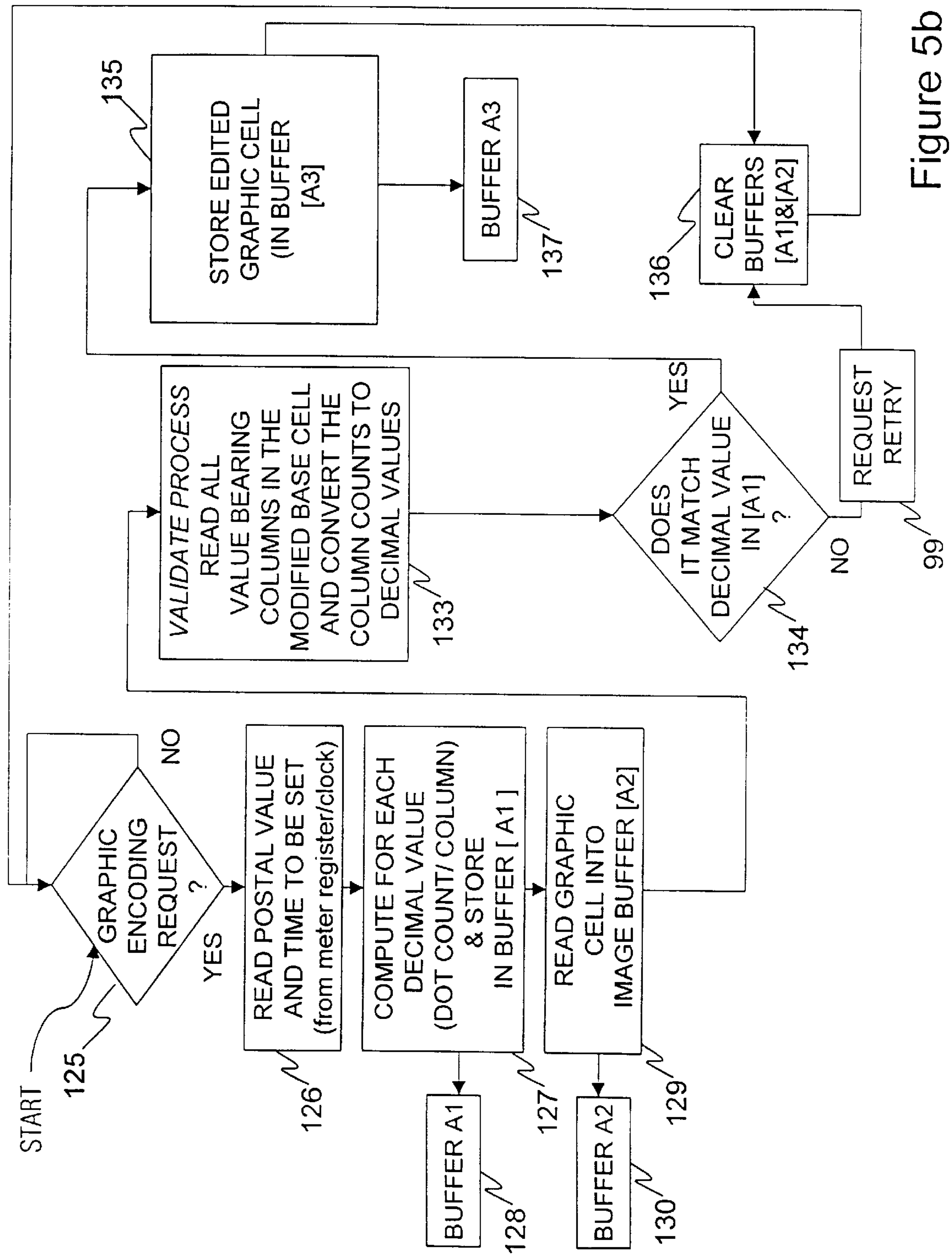
FIG. 5B is a flow chart showing how encoding block 304 is encoded.

FIG. 5B is a flow chart showing encoding block 304 is encoded. The program begins in decision block 125. Block 125 determines whether or not a graphic encoding request has been received from meter controller 52. If block 125 determines that a graphic encoding request has not been received, the program goes back to the input of block 125. If block 125 determines that a graphic encoding request has been received, the program goes to the input of block 126. Block 126 reads the amount of postage that was set in meter 50 by the user, i.e., $0.34, and the time the postage was set. Then the program goes to block 127 to compute each decimal value for the number of pixels in columns A, B, C, D, E, F, and G. Now the program goes to block 128 to store the value obtained in block 127 in the buffer of block 128. At this point the program goes to block 129 to read the base graphic cell (the remaining portions of graphic 300). The base graphic cell is then stored in the buffer in block 130.

At this point, the program goes to block 133 to begin the validation process. The validation process will read all the value bearing columns i.e., columns A, B, C, D, E, F, and G in the modified base cell and convert the column counts to decimal values. Now the program goes to decision block 134. Block 134 determines whether or not the value determined in block 133 matches the decimal value stored in the buffer of block 128. If block 134 determines that the value determined in block 133 does not match the value stored in the buffer of block 128, the program knows that a mistake was made, and the program goes to block 99 retry and to block 136. Block 136 will clear the buffers in blocks 128 and 130. Then the program will go back to the input of block 125. If block 134 determines that the value determined in block 133 matches the value stored in the buffer of block 128, the program knows that a mistake was not made and the program goes to the input of block 135. Block 135 adds the edited base cell encoding block 304 to the full graphic 300. The foregoing result is stored in the buffer of block 137. The program also goes to block 136 to clear the buffers in blocks 128 and 130. Then the program will go back to the input of block 125.

Figure 6:
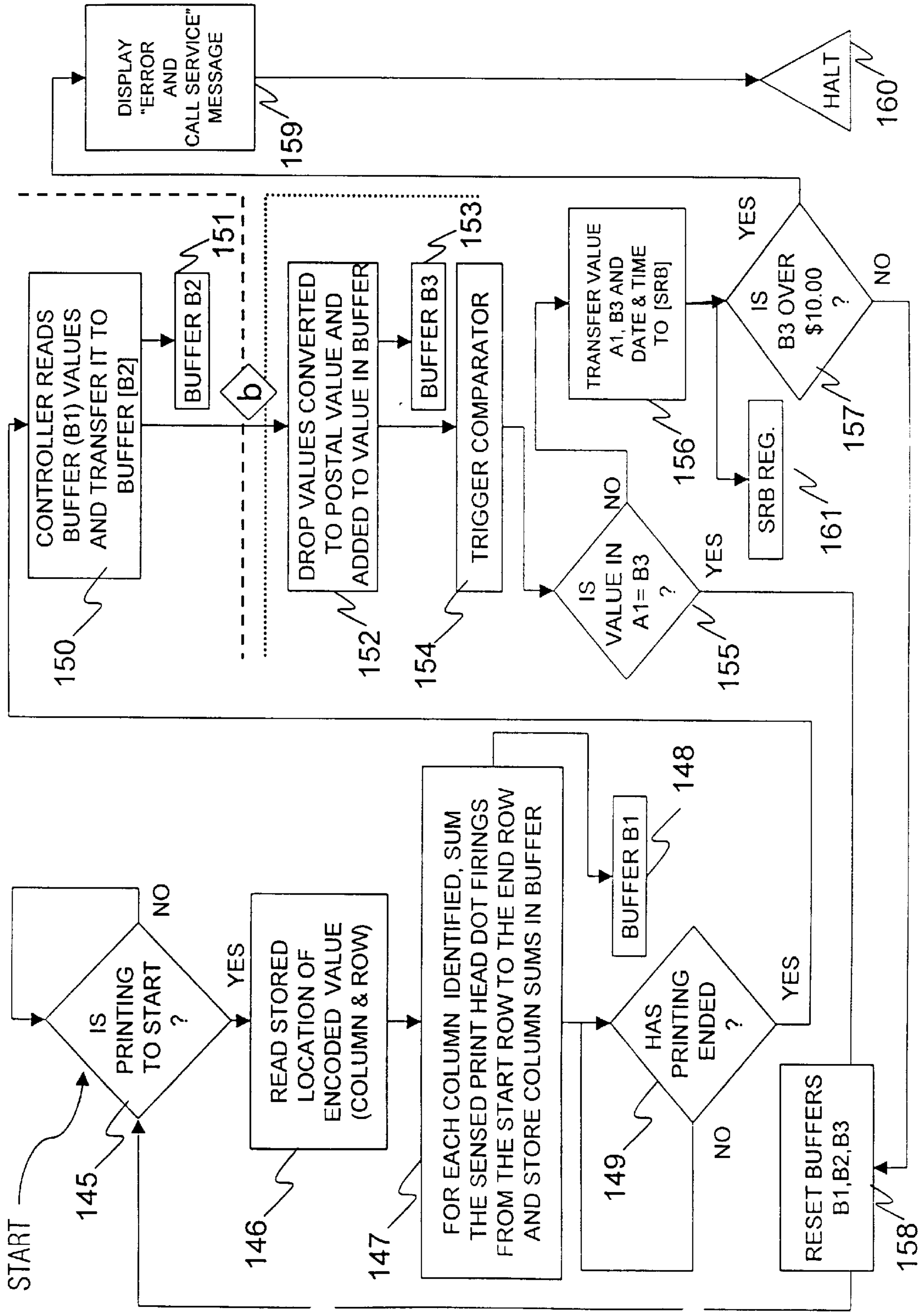
FIG. 6 is a flow chart of the program contained in controller 33, and a portion of the program contained in controller 52.

FIG. 6 is a flow chart of the program contained in controller 33 and a portion of the program contained in controller 52. The input to block 145 is received from controller 52. Decision block 145 determines whether or not the printing that is going to take place (FIG. 5B) has begun. If block 145 determines that the printing has not begun, the program goes back to the input of block 145. If block 145 determines that the printing has begun, the program goes to the input of block 146. Block 146 reads the stored locations of the encoded value by column and row. Then the program goes to block 147. For the identified postage columns, i.e., columns A, B, C, D, and E, block 147 sums the sensed print head pixel or drop firings transferred by line 39 (FIG. 3) from the start of a row to the end of a row for each of the five columns. For the two columns representing time, i.e., columns F and G, block 147 sums the sensed print head pixel of drop firings transferred by line 39 (FIG. 3) from the start of a row to the end of a row for each of the two columns. Then block 147 stores the column sum for each of the seven columns in the buffer in block 148. Now the program goes to decision block 149. Block 149 determines whether or not the printing has ended. If block 149 determines that the printing has not ended, the program goes back to the input of block 149. If block 149 determines that the printing has ended, the program goes to the input of block 150. In block 150, controller 33 (FIG. 3) reads the values stored in the buffer in block 148 and converts the values to a status message that is transferred to the drop to value converter 59 (FIG. 4) block 151. Then the program goes to block 152 where the drop values are converted to a postal value and a time value. The postal value and time value are stored in buffer 88 (FIG. 4) block 153 buffer.

At this point the program goes to block 154. Block 154 triggers comparator 58 (FIG. 4). Then the program goes to decision block 155. Block 155 determines whether or not the value in the buffer in block 128 equals the value in the buffer in block 153. In other words, does the postage set by the user of meter 50 and the time that it was set equal the coded value of the postage and time indicated in columns A, B, C, D, E, F, and G of encoding block 304, i.e., does the value in buffer 57 equal the value in buffer 88? If block 155 determines that the value of the buffer in block 128 equals the value of the buffer in block 153, the program goes to block 157 to reset the buffers in blocks 148, 151, and 153. Then the program goes back to the input of block 145. If block 155 determines that the value of the buffer in block 128 does not equal the value of the buffer in block 153, the program goes to block 156.

Block 156 will transfer the value of the buffer in block 128 and the value of the buffer in block 153 and the date and time to the Special Refill buffer in block 161.

Now the program will go to decision block 157. Block 157 will determine whether or not the value stored in the buffer of block 128 differs from the value stored in the buffer of block 153 by an amount greater than $10.00. If block 153 determines that the amount is less than $10.00, the program will go to block 158 to reset buffers 148, 151, and 153. Then the program will go back to the input of block 145. If block 153 determines that the amount is over $10.00, the program goes to block 159 to display the error to display a call service message. Then the program goes to block 160 and halts.

Figure 7A:
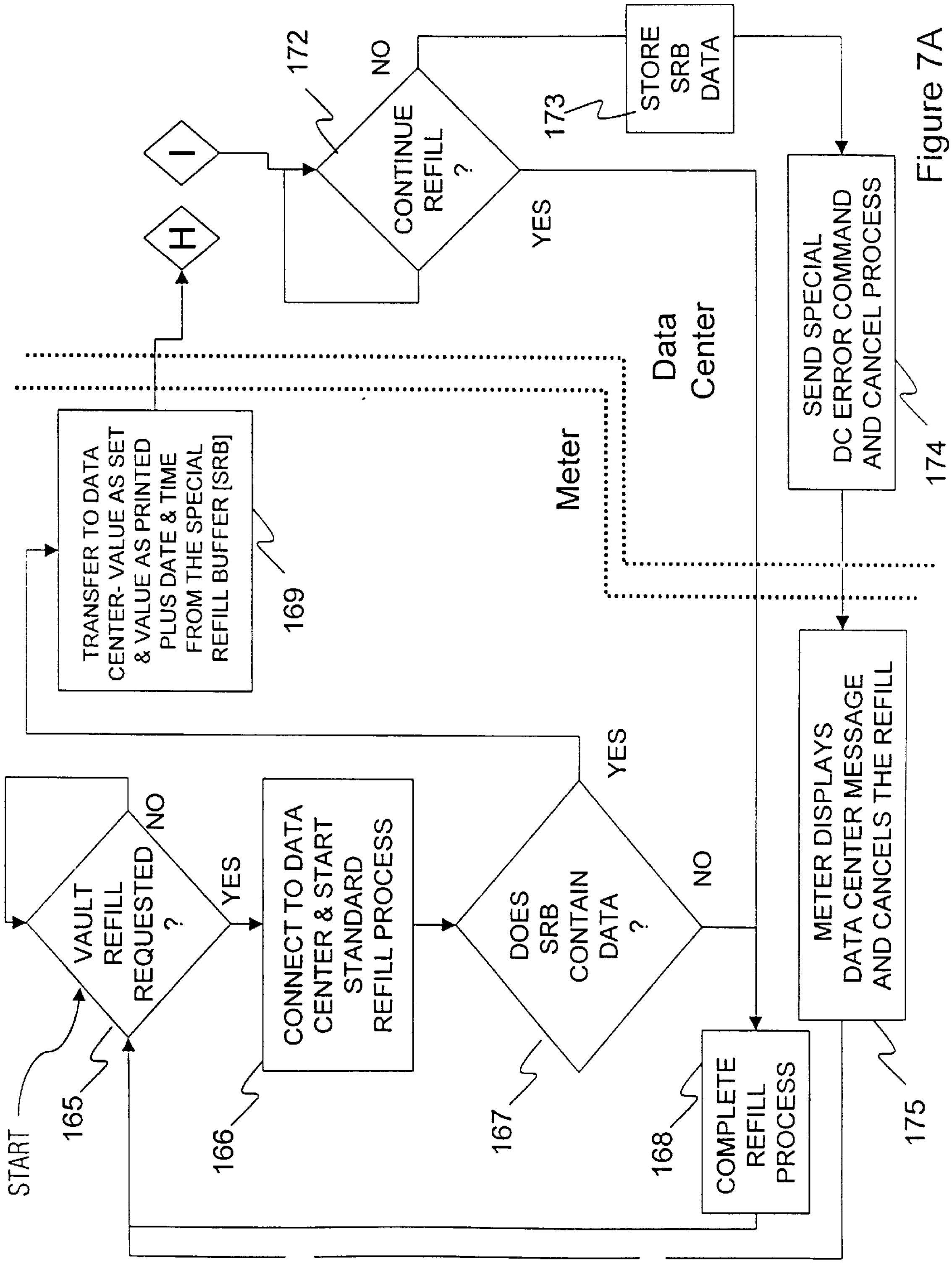
FIGS. 7A and 7B is a flow chart of a portion of the program contained in controller 52 and of the program contained in data center 62.
Figure 7B:
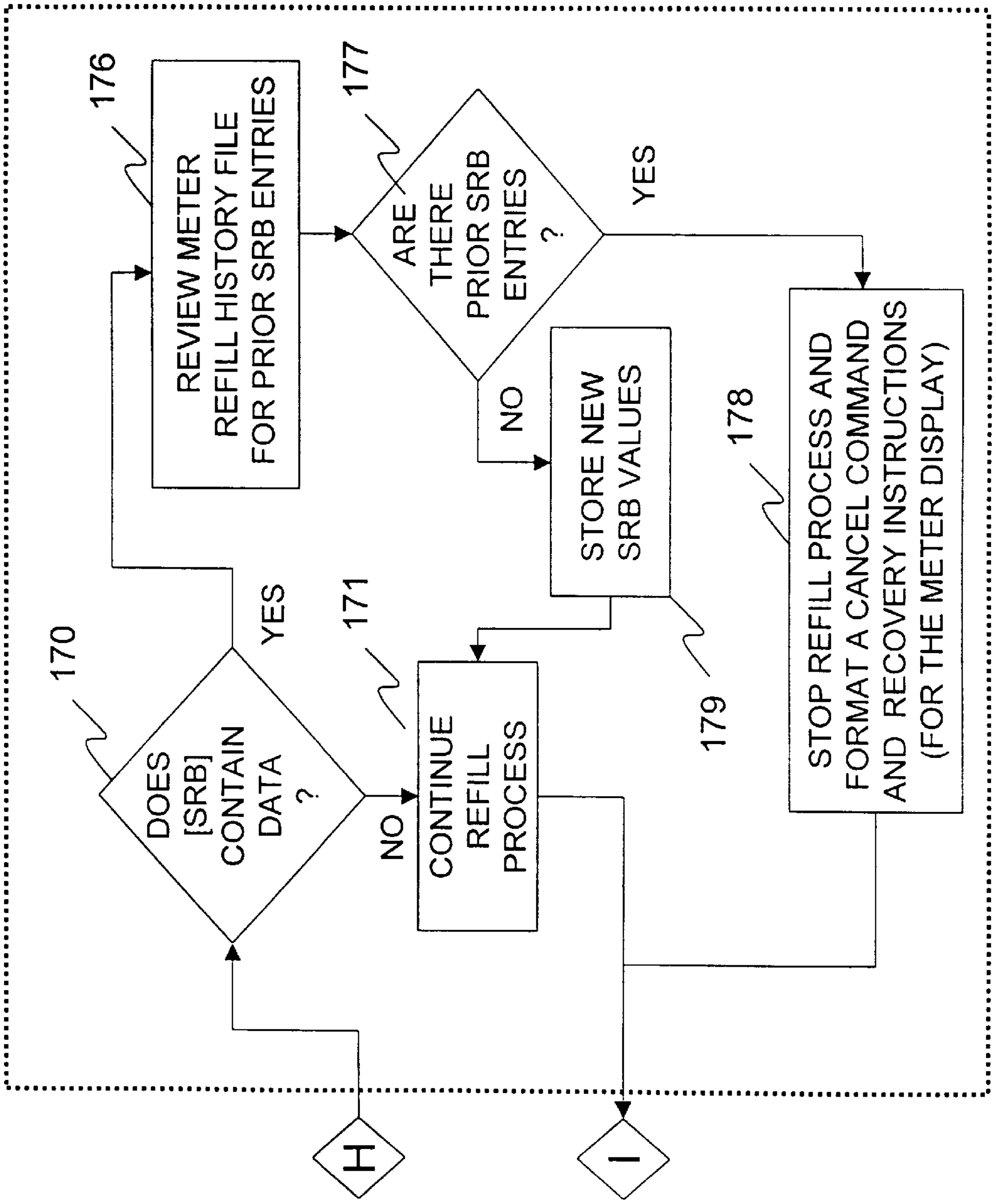

FIGS. 7A and 7B is a flow chart of a portion of the program contained in controller 52 and the program contained in data center 62. The input to block 165 comes from meter controller 52. Decision block 165 determines whether or not the user of meter 50 has requested that additional funds be added to the vault (not shown) of meter 50. If block 165 determines that no additional funds have been requested by the user of meter 50, the program goes back to the input of block 165. If block 165 determines that the user of meter 50 has requested that additional funds be added to the vault, the program goes to block 166. Block 166 connects meter 50 to data center 62 and starts the standard meter refill process (which is well-known in the art).

At this point, the program goes to decision block 167. Block 167 determines whether or not the special refill buffer in block 161 contains any data. If block 167 determines that the buffer in block 161 does not contain any data, the program goes to block 168 to complete the meter refill process. Then the program goes back to the input of block 165. If block 167 determines that the buffer in block 161 contains data, the program goes to block 169 to transfer to data center 62 the postage value, the time the meter was set by the user, the postage value as printed on mail piece 10, i.e.: $0.34, plus 46, the date, and time from the special refill buffer in block 161.

Then the program goes to the input of decision block 170 (FIG. 7B). Block 170 determines whether or not the special refill buffer in block 161 contains data. If block 170 determines that the buffer (not shown) in data center 62 does not contain data, the program goes to block 171 to continue the standard meter refill process. Now the program goes to the input of decision block 172 (FIG. 7A). Block 172 determines whether or not to continue the standard meter refill process. If block 172 determines to continue the refill process, the program goes to block 168 to continue the refill process. Then the program goes back to the input of block 165.

If decision block 170 (FIG. 7B) determines that the special refill buffer in block 161 contains data, the program goes to block 176 to review the meter refill history file for prior special refill buffer entries. Then the program goes to decision block 177. Block 177 determines whether or not there are any prior special refill buffer entries in block 161. If block 177 determines that there were prior entries in block 161, the program goes to block 178 to stop the meter refill process and format a cancel command and recovery instructions for the display of meter 50 (FIG. 4). Then the program goes back to the input of decision block 172 (FIG. 7A).

If block 172 determines not to continue the meter refill process, the program goes to block 173 to store the special refill buffer data in the buffer in data center 62 (not shown). At this point, the program goes to block 174 to transfer a special data center 62 (FIG. 4) error command and cancel the meter refill process. Then the program goes to block 175 to display the data center 62 error message on the display of meter 50 notifying the user of the cancellation of the refill process.

If block 177 determines that there are no prior special refill buffer entries in block 161, the program will go to block 179 to store the new special refill buffer entries. Then the program will go to block 171.

Figure 8:
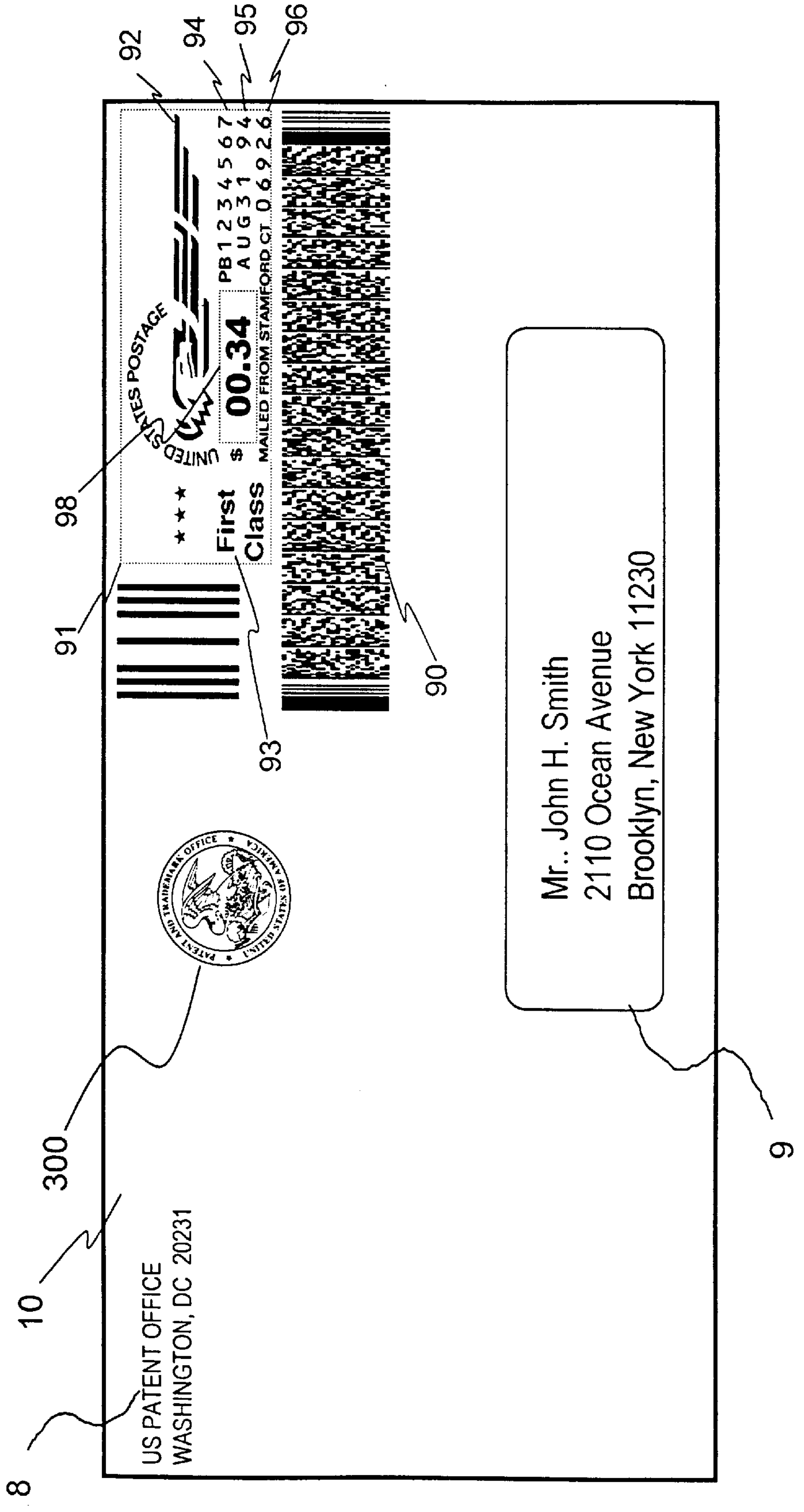
FIG. 8 is a drawing of an Information Based Indicia affixed to a mail piece.

FIG. 8 is a drawing of an Information Based Indicia affixed to mail piece 10. Indicia 91 has a graphic region 92, a fixed and variable text region 93 and a two dimensional bar code 90. Region 93 contains a postal meter serial number 94, the date 95, the place the mail piece was mailed from 96, and a dollar amount 98. Mail piece 10 also has a graphic 300, a return address, and a recipient address 9.

Indicia 91 may be produced by a personal computer, a printer combined with either a postal security device attached to the personal computer (personal computer postage meter) or a postal security device coupled to a personal computer via a data center and a printer (virtual postage meter).

Figure 9:
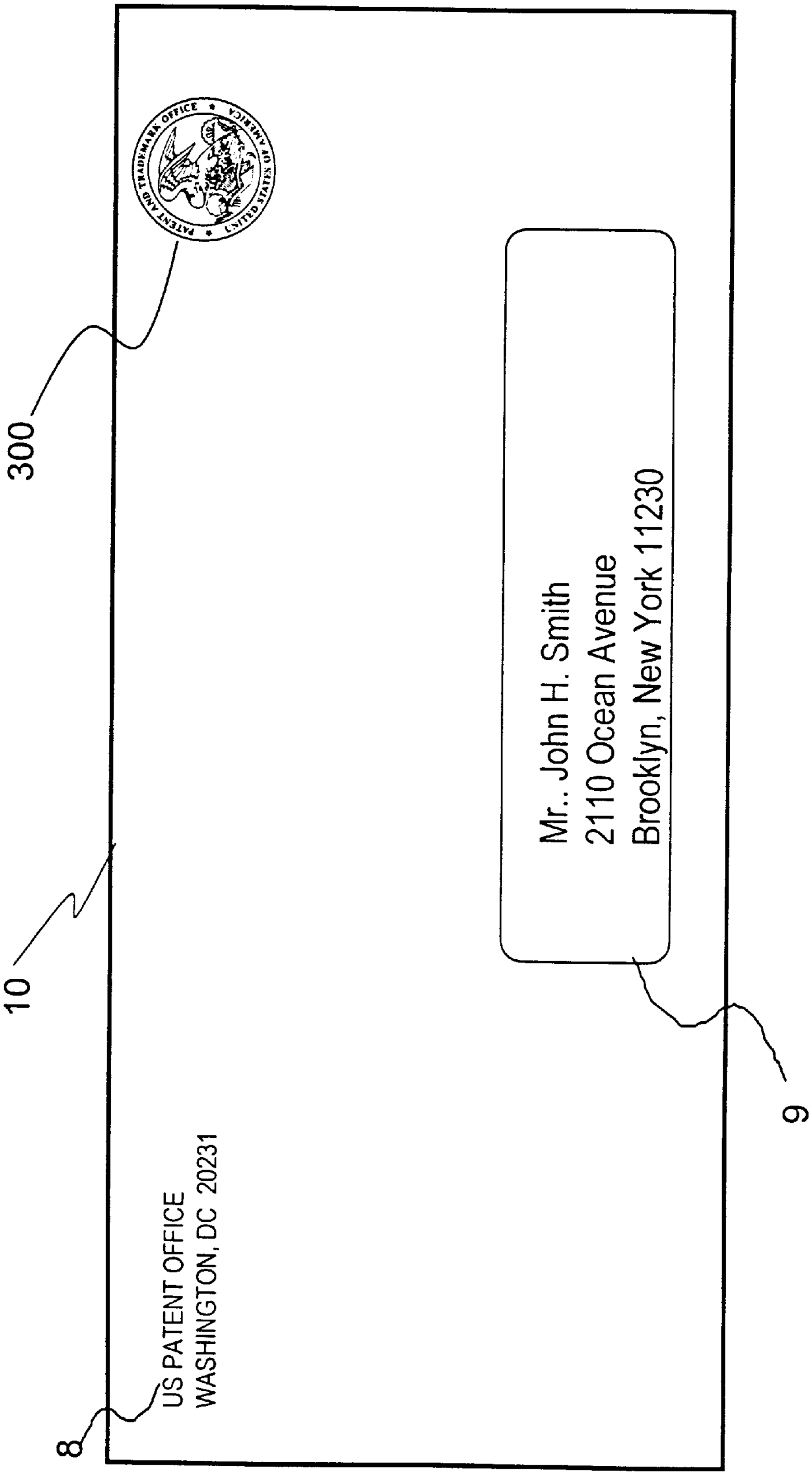
FIG. 9 is a drawing of an alternate embodiment of this invention showing graphic 300 used as a postal indicia.

FIG. 9 is an alternate embodiment of this invention showing graphic 300 used as a postal indicia. Mail piece 10 has a graphic 300 affixed thereto. Mail piece 10 also includes a return address 8 and a recipient address 9. As previously discussed herein, the amount of postage paid is hidden in graphic 300.

Figure 10:
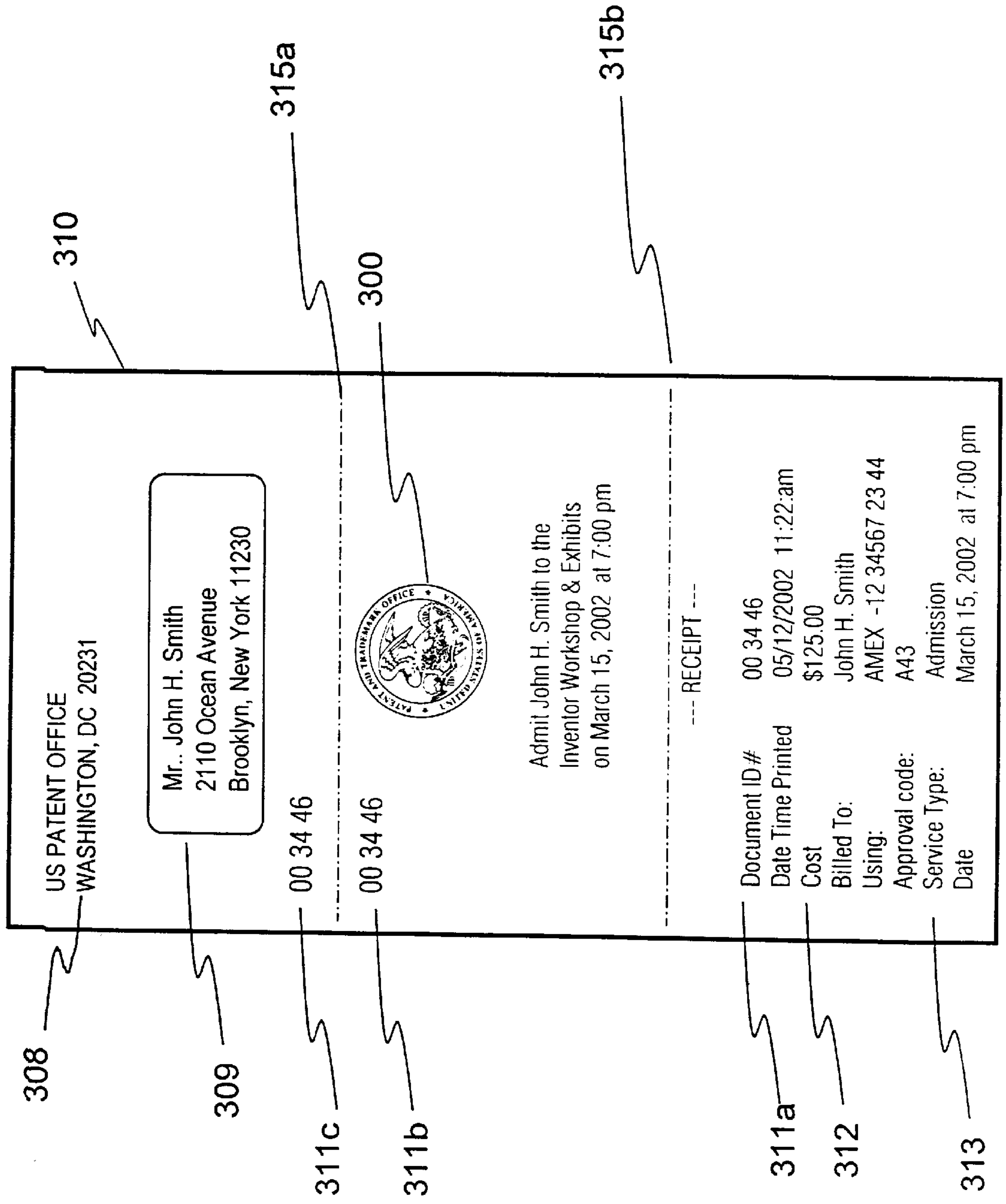
FIG. 10 a drawing of an alternate embodiment of this invention showing graphic 300 affixed to a document.

FIG. 10 a drawing of an alternate embodiment of this invention showing graphic 300 affixed to a document 310. Document 310 may be a ticket, a money order, bank check, tax stamp, government document, identification card, license, registration, finance document, stock certificate, etc. Document 310 has: an issuer field 308, that indicates the party issuing the document; a recipient field 309 that indicates the party that the document was issued to; identification fields 311*a*, 311*b*, and 311*c* that identify the document or some characteristic of the document or characteristic of the device that produced the document; a document value field 312; and a service or item field 313 that indicates the service supplied or the place of services or item supplied. Depending on the type of document 310, document 310 may contain some or all of fields 308, 309, 311*a*, 311*b*, 311*c*, 312 and 313. Some or all or a portion of the numeric information contained in fields 308, 309, 311*a*, 311*b*, 311*c*, 312 and 313 may be hidden in graphic 300. Document 310 may have perforations 315*a* and 315*b* so that the document receipt ma be separated from the ticket portion.

The above specification describes a new and improved apparatus that hides information in a customer supplied graphic. It is realized that the above description may indicate to those skilled in the art additional ways in which the principals of this invention may be used without departing from the spirit. It is, therefore, intended that this invention be limited only by the scope of the appended claims.

What is claimed is:

1. A method for printing postage using a postage meter, the improvement comprising:

hiding information in a customer supplied graphic so that the amount of postage debited by the meter is hidden in the graphic; and a postal indicia indicates the amount of postage debited by the meter, wherein the graphic contains a plurality of pixels, and a portion of the pixels form a code that indicates the amount of postage that has been paid, wherein the pixels that comprise the code are arranged in columns and rows, and the amount of postage paid is encoded by the pixels in the columns, wherein a portion of one of the columns is encoded by the pixels to indicate tens of dollars of postage paid;

a portion of one of the columns is encoded by the pixels to indicate dollars of postage paid;

a portion of one of the columns is encoded by the pixels to indicate tens of cents of postage paid;

a portion of one of the columns is encoded by the pixels to indicate the number of cents of postage paid; and a portion of one of the columns is encoded by the pixels to indicate tenths of cents of postage paid.

2. The method for printing postage using a postage meter claimed in claim 1, wherein the graphic is affixed to a document.

3. The method for printing postage using a postage meter claimed in claim 1, wherein the graphic contains a plurality of pixels and a portion of the pixels form a code that indicates the amount paid for the document.

4. The method for printing postage using a postage meter claimed in claim 1, wherein the graphic contains a plurality of pixels and a portion of the pixels form a code that indicates a party issuing the document.

5. The method for printing postage using a postage meter claimed in claim 1, wherein the graphic contains a plurality of pixels and a portion of the pixels form a code that uniquely identifies the document.

6. The method for printing postage using a postage meter claimed in claim 1, wherein the graphic contains a plurality of pixels and a portion of the pixels form a code that indicates the service specified by the document.

7. A method for printing postage using a postage meter, the improvement comprising:

hiding information in a customer supplied graphic so that the amount of postage debited by the meter is hidden in the graphic, wherein the graphic contains a plurality of pixels and a portion of the pixels form a code that indicates the time that the postage has been set in the meter, wherein the pixels that comprise the code are arranged in columns and rows, and the time that the postage has been set in the meter is encoded by the pixels in the columns, wherein a portion of one of the columns is encoded by the pixels to indicate number of tens of seconds; and a portion of one of the columns is encoded by the pixels to indicate number of seconds.

8. The method for printing postage using a postage meter claimed in claim 7, wherein the meter includes a printer that produces one or more pulses for each pixel printed.

9. The method for printing postage using a postage meter claimed in claim 7, wherein the meter includes a printer that produces one or more ink jet pulses for each pixel printed by a drop of ink.

10. A method for printing postage using a postage meter, the improvement comprising:

hiding information in a customer supplied graphic so that the amount of postage debited by the meter is hidden in the graphic, wherein the pixels that comprise the code are arranged in columns and rows, and the amount of postage paid is encoded by the pixels in one or more of the rows, wherein a portion of one of the rows is coded by the pixels to indicate tens of dollars of postage paid;

a portion of one of the rows is coded by the pixels to indicate dollars of postage paid;

a portion of one of the rows is coded by the pixels to indicate tens of cents of postage paid;

a portion of one of the rows is coded by the pixels to indicate number of cents of postage paid; and a portion of one of the rows is coded by the pixels to indicate tenths of cents of postage paid.

11. The method for printing postage using a postage meter claimed in claim 10, wherein a portion of one of the rows is coded by the pixels to indicate the number of tens of seconds, and a portion of one of the rows is encoded by the pixels to indicate the number of seconds.

12. The method for printing postage using a postage meter claimed in claim 10, wherein the meter includes a printer that produces one or more pulses for each pixel printed.

13. The method for printing postage using a postage meter claimed in claim 10, wherein the meter is an electronic postage meter.

14. The method for printing postage using a postage meter claimed in claim 10, wherein the meter is a personal computer and a postal security device.

15. The method for printing postage using a postage meter claimed in claim 10, wherein the meter is a virtual meter.

* * * * *